(12) United States Patent
Bird (10) Patent No.: US 12,205,145 B2
(45) Date of Patent: *Jan. 21, 2025

(54) METHODS FOR DELIVERING MOBILE ADVERTISEMENT

(71) Applicant: THEATRICALITY LLC, Los Angeles, CA (US)

(72) Inventor: Christopher Scott Bird, Medellin (CO)

(73) Assignee: THEATRICALITY LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/491,883

(22) Filed: Oct. 23, 2023

(65) Prior Publication Data

US 2024/0046310 A1 Feb. 8, 2024

Related U.S. Application Data (63) Continuation of application No. 16/926,349, filed on Jul. 10, 2020, now Pat. No. 11,842,369.

(Continued)

(51) Int. Cl.
*H04W 4/23* (2018.01)
*G06F 3/14* (2006.01)
(Continued)

(52) U.S. Cl.
CPC .......... *G06Q 30/0266* (2013.01); *G06F 3/14* (2013.01); *G06K 19/06037* (2013.01);
(Continued)

(58) Field of Classification Search
CPC .......... G06Q 30/0264; G06Q 30/0266; G06Q 30/0272; H04W 4/23
See application file for complete search history.

(56) References Cited

U.S. PATENT DOCUMENTS 7,449,998 B1 11/2008 Au et al.
9,087,465 B2 7/2015 Griffin et al.
(Continued)

FOREIGN PATENT DOCUMENTS

KR 1020190087933 A 7/2019
WO 2009039350 A1 3/2009
(Continued)

OTHER PUBLICATIONS

Adomni, Uber OOH (accessed 2021).
Yaham, Taxi Roof LED Display (2022).

*Primary Examiner* — Azam A Ansari
(74) *Attorney, Agent, or Firm* — Fishman Stewart PLLC; Cecily Anne O'Regan (57) ABSTRACT

Systems, methods, apparatuses and articles of manufacture for mobile advertisement systems are disclosed. A mobile advertising system in accordance with the present disclosure comprises a device capable of determining a geolocation of the device, at least one sensor, coupled to the device, for determining at least a motion of the device, a display, coupled to the device in which the display faces in a direction; and a camera, coupled to the device, in which the camera captures an scene in the direction, in which the device sends at least one image to the display based at least in part on the geolocation of the device, the determined motion of the device, and the scene in the direction, and the display shows the at least one image in the direction.

23 Claims, 4 Drawing Sheets

US 12,205,145 B2

Page 2

Related U.S. Application Data

(60) Provisional application No. 62/872,387, filed on Jul. 10, 2019.

(51) Int. Cl.
  *G06K 19/06* (2006.01)
  *G06Q 30/0251* (2023.01)
  *G06Q 30/0272* (2023.01)
  *G06Q 30/0273* (2023.01)
  *G06V 20/56* (2022.01)
  *H04N 23/54* (2023.01)
  *H04W 4/029* (2018.01)

(52) U.S. Cl.
  CPC ..... *G06Q 30/0264* (2013.01); *G06Q 30/0267* (2013.01); *G06Q 30/0272* (2013.01); *G06Q 30/0273* (2013.01); *G06V 20/56* (2022.01); *H04N 23/54* (2023.01); *H04W 4/029* (2018.02); *H04W 4/23* (2018.02)

(56) References Cited

U.S. PATENT DOCUMENTS

| | | | |
|---|---|---|---|
| 9,775,003 B2 | 9/2017 | Ciecko et al. | |
| 9,934,709 B2 | 4/2018 | Lanham | |
| 10,416,947 B2 * | 9/2019 | Zenoff | G06F 1/1654 |
| 10,636,335 B2 | 4/2020 | Pinero et al. | |
| 10,665,155 B1 | 5/2020 | Rao | |
| 10,740,796 B2 * | 8/2020 | Brubaker | G09F 9/30 |
| 10,762,809 B1 | 9/2020 | DeLorean | |
| 10,957,227 B2 | 3/2021 | DeLorean | |
| 11,842,369 B2 | 12/2023 | Bird | |
| 2007/0011051 A1 | 1/2007 | Findlay et al. | |
| 2008/0172781 A1 | 7/2008 | Popowich et al. | |
| 2010/0250368 A1 | 9/2010 | Porco | |
| 2010/0259058 A1 | 10/2010 | Knighton et al. | |
| 2012/0303458 A1 | 11/2012 | Schuler, Jr. | |
| 2013/0304565 A1 | 11/2013 | Saccoman | |
| 2014/0040016 A1 | 2/2014 | Amla et al. | |
| 2014/0344062 A1 * | 11/2014 | Lamont | G06Q 30/0267 705/14.64 |
| 2016/0316232 A1 | 10/2016 | Lee | |
| 2017/0091822 A1 | 3/2017 | Tian et al. | |
| 2018/0285931 A1 | 10/2018 | Dawson et al. | |
| 2019/0251600 A1 | 8/2019 | Cabrera et al. | |
| 2020/0186695 A1 * | 6/2020 | Helweg-Larsen | H04N 23/62 |
| 2020/0410541 A1 | 12/2020 | James | |
| 2021/0012382 A1 | 1/2021 | Bird | |
| 2021/0125227 A1 | 4/2021 | Lee et al. | |
| 2021/0350412 A1 | 11/2021 | Harwood et al. | |
| 2021/0350414 A1 | 11/2021 | Kardesler et al. | |
| 2021/0374805 A1 | 12/2021 | Gaither | |
| 2021/0406957 A1 | 12/2021 | Riley et al. | |

FOREIGN PATENT DOCUMENTS

| | | |
|---|---|---|
| WO | 2021154418 A1 | 8/2021 |
| WO | 2024123718 A3 | 6/2024 |

* cited by examiner

METHODS FOR DELIVERING MOBILE ADVERTISEMENT

CROSS-REFERENCE TO RELATED APPLICATIONS

This application is a continuation of application Ser. No. 16/926,349 filed Jul. 10, 2020, which claims the benefit of provisional patent application Ser. No. 62/872,387, filed Jul. 10, 2019, which are incorporated by reference herein in their entirety.

BACKGROUND

The present disclosure pertains generally to devices and methods related to advertisement systems, and more particularly to mobile advertisement systems.

The automobile and/or other forms of transportation are almost a necessity in many cities. On public transportation vehicles, e.g., buses, trains, etc., static advertisements are often present, on the exterior sides of the vehicle and/or in the passenger compartments. Taxicabs also have static displays often mounted on the roof of the vehicle.

Many people, however, use their own vehicles for transportation. In large cities such as Los Angeles, many people spend long periods of time driving to and from work, as well as driving to and from shopping locations, stores, etc.

More recent advances in technology have allowed people to use their own vehicles for "ridesharing" or "ridesourcing" vehicles through companies such as Uber® and/or Lyft®. These companies allow for use of cellular telephones and other communications techniques to create a private taxi fleet, which techniques can alert drivers that a person needs a ride from their current location to another location. The system then provides information to the driver and potential passenger, and connects the driver and passenger for the designated trip.

When driving a vehicle, there are many advertisements placed where drivers/passengers can see them, e.g., billboards, buildings, storefronts, and other locations where businesses can be identified to a driver. Many of these locations are not directly in the driver's field of view, however, and require the driver to divert his/her attention to the billboard, storefront, etc., and away from the traffic that is closest to their vehicle.

SUMMARY

Aspects of the present disclosure comprise a mobile advertisement system that is coupled to a person's vehicle. The advertisements are sent to the vehicle wirelessly, and displayed on a screen at the rear of the vehicle. The driver receives payment for the advertisements displayed.

A mobile advertising system in accordance with the present disclosure comprises a device capable of determining a geolocation of the device, at least one sensor, coupled to the device, for determining at least a motion of the device, a display, coupled to the device in which the display faces in a direction; and a camera, coupled to the device, in which the camera captures an scene in the direction, in which the device sends at least one image to the display based at least in part on the geolocation of the device, the determined motion of the device, and the scene in the direction, and the display shows the at least one image in the direction.

Such a system further optionally includes the at least one image being a video segment, a length of the video segment being based at least in part on a change in the image, the display being further coupled to an automobile, the at least one sensor being an accelerometer, the device calculating a display time for each image in the at least one image shown on the display in the direction, the device sending at least one image to the display further based at least in part on a time of day, the at least one image comprising a quick response (QR) code, a uniform resource locator (URL), and/or a discount code, a remuneration being associated with each image of the at least one image, and a list of images being pre-programmed into the device to be shown on the display.

The above summary has outlined, rather broadly, some features and technical advantages of the present disclosure in order that the detailed description that follows may be better understood. Additional features and advantages of the disclosure will be described below. It should be appreciated that this disclosure may be readily utilized as a basis for modifying or designing other structures for carrying out the same purposes of the present disclosure. It should also be realized that such equivalent constructions do not depart from the teachings of the disclosure. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The present disclosure is directed toward a mobile advertisement system that is coupled to a person's vehicle. The advertisements are sent to the vehicle wirelessly, and displayed on a screen at the rear of the vehicle. The driver receives payment for the advertisements displayed.

Embodiments of the disclosure are described herein with reference to cross-sectional, block diagrams, and/or view illustrations that are schematic illustrations of embodiments of the disclosure. As such, the actual dimensions of elements can be different, and variations from the shapes of the illustrations as a result, for example, of manufacturing techniques and/or tolerances are expected. Embodiments of the disclosure should not be construed as limited to the particular shapes of the regions illustrated herein but are to include deviations in shapes that result, for example, from manufacturing. A region illustrated or described as square or rectangular may have slightly rounded or curved features due to normal manufacturing tolerances. Thus, the regions illustrated in the figures are schematic in nature and their shapes are not intended to illustrate the precise shape of a region of a device and are not intended to limit the scope of the disclosure. It is understood that the shapes, sizes, and locations in the attached figures may not be to scale.

Overview

The present disclosure relates to the use of a tablet-style electronic display screen mounted on the exterior of a passenger vehicle (car, truck, bus, motorcycle, boat, etc.) and an interconnected software program or application connected wirelessly to the worldwide web, which jointly facilitate the display of interactive, targeted, location-based advertising and messaging to the occupants of surrounding passenger vehicles, with the ability to commence, continue, discontinue, and/or otherwise adjust said advertising and messaging based on the physical characteristics and/or behavior of the surrounding vehicles.

System Description

Figure 1:
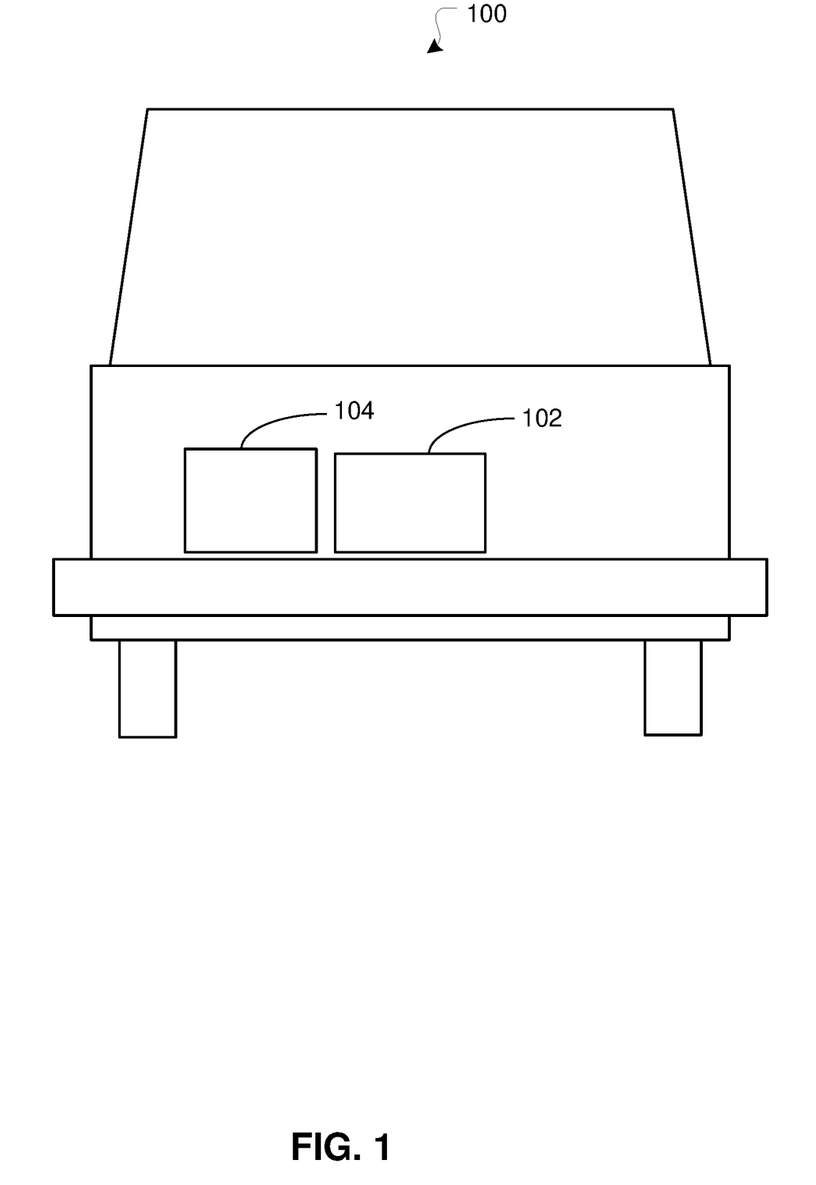
FIG. 1 is a view of an automobile in accordance with an aspect of the present disclosure.

FIG. 1 is a view of an automobile in accordance with an aspect of the present disclosure.

In an aspect of the present disclosure, automobile 100 comprises, among other things, a license plate 102. In an embodiment of the present disclosure, a display screen 104 is mounted to automobile 100 adjacent to license plate 102. Although shown in FIG. 2 on the left side of license plate 102, display screen 104 may be mounted above, below, or in any location adjacent to license plate 102 without departing from the scope of the present disclosure.

Figure 2:
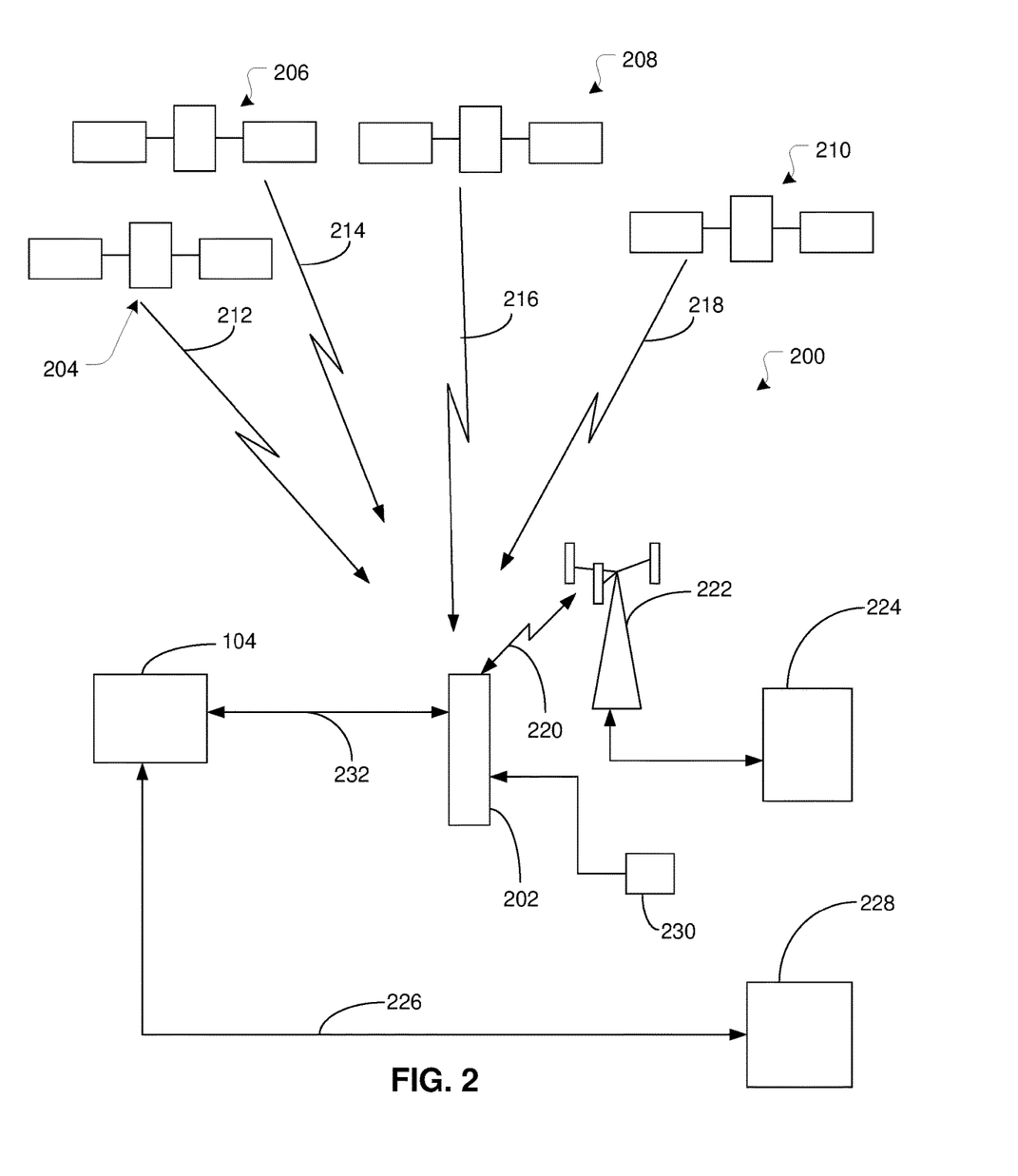
FIG. 2 illustrates a block diagram of a system in accordance with an aspect of the present disclosure.

FIG. 2 illustrates a block diagram of a system in accordance with an aspect of the present disclosure.

System 200 comprises display 104 and device 202. Device 202 may be a cellular telephone, or may be a separate device that has capabilities to determine location and receive wireless communications. In an aspect of the present disclosure, device 202 may be a cellular telephone with geolocation and wireless communications capabilities, and is described as such herein. However, other devices 202 are possible, including devices that are integrated with and/or part of display 104, or devices that are integrated with and/or part of the vehicle's GPS system, without departing from the scope of the present disclosure.

Device 202 may receive communications signals from satellites 204, 206, 208, and 210, namely signals 212, 214, 216, and 218. Device 202 may receive communications signals from additional satellites, or from other sources, in order to determine the geolocation of device 202.

Device 202 may also transceive signals 220 from a cellular communications tower 222. Signals 220 may be sent from external sources 224 to device 202 via tower 222. Signals 226 may also be sent to/from display 104 directly from system 228. System 228 may be a navigation system, computer system, and/or other electronics system(s) in vehicle 100. Device 202 may also be coupled to one or more sensors 230.

As device 220 determines its geolocation, and receives information from outside sources 224, e.g., which advertisements to display, etc., and sensors 230, e.g., whether driving and/or other circumstances have changed, device 220 communicates with display 104 via signals 232 to display one or more advertisements. Signals 232 may be sent wirelessly between display 104 and device 202, or may have a hard-wired connection between display 104 and device 202, as desired.

In an aspect of the present disclosure, display 104 may be merely a display screen with a wireless transmitter/receiver, such that technology contained in a cellular telephone can be utilized when device 202 is a cellular telephone. As such, display 104 may act as a remote display for device 202 for the advertisements, and device 202 may be used in parallel by a driver/passenger for other functions. In another aspect of the present disclosure, display 104 may have a dedicated and/or integrated device 202 for the functions/displays described as part of the present disclosure.

Although shown as a single display 104, display 104 may comprise multiple display screens, e.g., one display on each side of license plate 102, or one above and one below the license plate 102, etc., which may be used to display identical advertisements/messages or advertisements that work in sequence or relation with one another. Additionally, should conventional vehicle license plates no longer be required by law on the rear of a vehicle, a larger display screen might be used of a screen located where the license plate might otherwise have been placed.

Further, although described as a display 104, which may evoke embodiments similar to those used on cellular telephones, tablets, etc., display 104 may be an electronic projection system that projects an image onto the rear side of a non-electronic screen, causing the image to be visible to a following vehicle. In such an embodiment, the screen might be attached to the vehicle 100 in various ways, some of which are similar to those described herein. In such an embodiment, the image displayed may be projected from a projector located elsewhere in the vehicle 100 as desired, or the display 104 may be projected through the rear window of the vehicle 100 from a projector located inside the cabin of the vehicle 100.

Another embodiment of the present disclosure may have a display 104 with a flexible Organic Light Emitting Diode ("OLED") screen rather than a traditional, rigid tablet type screen. This flexible OLED screen can be affixed to the vehicle 100 surface and/or the surface of the vehicle 100 rear window. The flexibility of a display 104 implementing flexible technology may allow for better alignment of display 104 with the contours of vehicle 100 surfaces. Other embodiments of system 200 may incorporate display 104 into vehicle 100 during the vehicle 100 manufacturing process.

In another embodiment of the present disclosure, display 104 may be concealed or partly concealed and adjusted to a viewing position when designated by the driver, system 200, sensor 230 signal, and/or other factors. Such an embodiment may include additional advantages over a fixed display 104, e.g., the ability to secure system 200 when the vehicle 100 is parked and/or traveling at speeds that might damage system 200, as well as the ability to move display 104 for better viewing by other vehicles.

In another embodiment of the present disclosure, display 104 may include, alternatively and/or additionally, a holographic image that is projected near the exterior of the vehicle.

Display Operation

Figure 3:
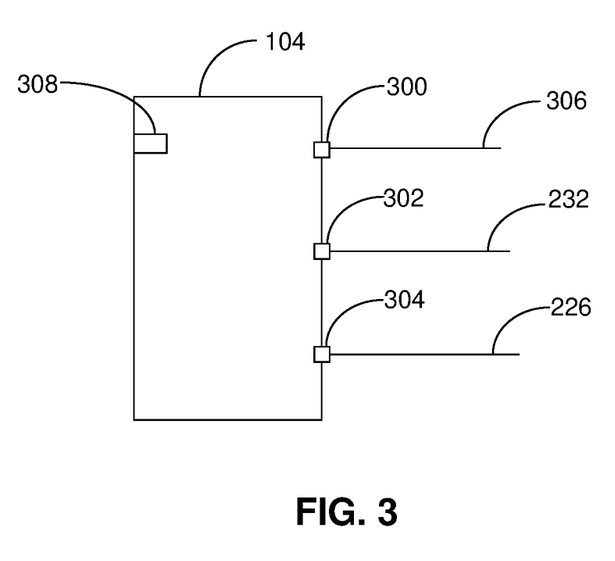
FIG. 3 illustrates a display in accordance with an aspect of the present disclosure.

FIG. 3 illustrates a display in accordance with an aspect of the present disclosure.

Display 104 has connections 300, 302, and 304. Connection 300 receives power inputs 306 for powering display 104. Power inputs 306 may be an external battery, or may be an input of energy to charge a battery that is internal to display 104. For example, and not by way of limitation, power inputs 306 may be inputs from a solar cell, and/or may be leads from an external battery or from the vehicle 100 electrical system, such as through charging ports in vehicle 100, connecting to existing vehicle 100 light and/or power sources, or other means. Power inputs 306 may be contact charging through the body of the vehicle 100, or through other locations if desired. When the display 104 indicates that the power input 300 and/or power inputs 306 are low, display 104 can send a message to device 202 via connection 302/signals 232 that a low power condition has been reached.

Display 104 may also comprise a camera 308 that faces in the same direction as the displayed advertisement. As such, camera 308 may view the scene behind vehicle 100, and may transmit the visual information of the scene behind vehicle 100, including information about the exact proximity of a following vehicle, to device 202 via signals 232. Device 202 may then assess the characteristics of the scene behind vehicle 100, and may monitor the scene for any changes in the scene, e.g., vehicles changing lanes, brand indicators on vehicles behind vehicle 100, license plates of vehicles behind vehicle 100, whether vehicles behind vehicle 100 are moving or standing still, rates of acceleration/deceleration, number of occupants in a vehicle, etc.

Because display 104 and/or device 202 can identify vehicle proximities, sizes, speeds, makes/models, whether vehicle 100 is moving and whether vehicles around vehicle 100 are moving, and/or other characteristics, system 200 can employ the gathered information, in combination with relevant geolocation data such as the location of nearby businesses, to determine which advertisements might be applicable to the vehicles behind vehicle 100, and display the proper advertisements to such vehicles. Such determinations may be made in an application and/or program in device 102.

For example, and not by way of limitation, device 202 can determine a geolocation of system 200/vehicle 100, and may determine that vehicle 100 is approaching a signal-controlled intersection. Device 202 can also determine the speed of vehicle 100, and may determine that vehicle 100 is decelerating. This may indicate to device 202 that vehicle 100 is about to stop at a red light at the signal-controlled intersection.

If indeed vehicle 100 stops at signal controlled intersection for more than an allotted time, device 202 has enough information to determine that vehicle 100 may be stationary for approximately thirty seconds (or some other amount of time) because vehicle 100 is at a stop light. If camera 308 shows a change in scene behind vehicle 100, or shows that there is another vehicle behind vehicle 100, then system 200 has enough information to determine that the vehicle behind vehicle 100 will remain behind vehicle 100 for approximately the same amount of time that vehicle 100 is stopped, and if desired will respond by displaying an advertisement of appropriate duration.

In traffic that has variable speeds, e.g., "slow and go" and/or "stop and go" traffic, one or more sensors 230 such as a camera, accelerometer, etc., may determine that the vehicle 100 has come to a stop and/or has reduced speed, and the camera may determine that the scene behind vehicle 100 is not changing and thus the vehicle behind vehicle 100 has stopped. In such a situation, the system 200 may determine whether vehicle 100 has stopped at a stop sign or is stopped for a longer period of time at a stop light, etc. Such a determination may be made and/or may be assisted by other sensors 230, e.g., whether the engine has been turned off, the GPS location of vehicle 100, whether the user's mobile device has been removed from vehicle 100, etc.

Although it is possible that the driver of vehicle 100 may stop for longer than necessary in certain situations in order to earn additional income, other sensors 230 may be employed to reduce and/or prevent such additional remunerations from occurring. For example, and not by way of limitation, other sensors 230 may be attached to other portions of vehicle 100, e.g., the front of vehicle 100, to determine whether vehicle 100 has remained stopped longer than necessary to reduce the incentive to stop longer than necessary. Other techniques, e.g., GPS positioning of vehicle 100, etc., may also be used to determine appropriate stopping times for vehicle 100 as desired. Such indications of excessive stoppage time of vehicle 100 may also be displayed to the driver of vehicle 100 to indicate that the driver is not earning additional money during such times.

Camera 308 may also be able to determine the type of vehicle that is stopped behind vehicle 100. Camera 308 may be able to detect a grille pattern, brand badge, vehicle shape, or other indicators to determine the type of vehicle that is stopped behind vehicle 100. Camera 308 may also be able to determine whether there is a passenger in the vehicle(s) stopped behind vehicle 100. By taking various indicators into account, system 200 may target a specific advertisement and/or set of advertisements on display 104 towards the vehicle stopped behind vehicle 100. System 200 may also take into account other events, e.g., geolocation, traffic conditions, changes in the scene detected by camera 308, etc., to help determine what advertisements to show on display 104 and/or when to change advertisements on display 104. Such indicators may contribute to increasing safety conditions by not playing longer and/or specific advertisements while vehicle 100 is moving.

Camera 308, although shown as part of display 104, may be a backup camera that is part of vehicle 100. As such, signals 226 may include the inputs from camera 308, and these signals can be routed to device 202 as needed to determine the various characteristics of the scene behind vehicle 100. In an aspect of the present disclosure, display 104 may be combined with a built-in backup camera of vehicle 100, which may reduce the overall costs of system 200 and may reduce and/or eliminate the inclusion of camera 308 in system 200. In an aspect of the present disclosure, the characteristics of the vehicle 100 and the surrounding vehicles near vehicle 100 provide a dynamic environment in which system 200 may display targeted advertisements within the driver/passenger field of view. System 200 may differentiate between vehicles and the statistical demographics of owners of such vehicles, and provide different advertisements to different vehicles based on the type of vehicle that is identified by system 200 and the driving conditions that vehicle 100 is experiencing.

For example, and not by way of limitation, when vehicle 100 is moving, a static display, or periodically rotating display of advertisements, may be displayed on display 104. When vehicle 100 is stopped, and the vehicle(s) behind vehicle 100 are a "captive audience", system 200 may display a longer advertisement such as a movie trailer or commercial. Further, advertisements may be "local" in that if vehicle 100 is on a specific road, then local businesses may have advertisements displayed on vehicle 100; if vehicle 100 is on a different road, or a freeway, different advertisements may be displayed by vehicle 100/system 200. As vehicle 100 transitions from a stopped position to an accelerating/moving vehicle, system 200 can switch from a longer advertisement to a more static type of display to reduce driver distraction.

System 200 may also allow for inputs from the operator/driver of vehicle 100 to display certain messages, e.g., the logo of a sports team or university, a symbol, or a brief message that the operator/driver of vehicle 100 wishes to display. An application for a mobile device, and/or system 200, may include "hands free" functions for sending user-generated messages to the display screen in order to augment safety, including but not limited to a variety of pre-composed messages which the driver may select and send to the display screen using verbal commands only. In another embodiment, the display 104 may show a message from an advertiser and include a corporate logo or product name.

In an aspect of the present disclosure, system 200 may be able to determine that the same vehicle(s) are behind vehicle 100 for a progression of stops and starts in traffic. In such an aspect, system 200 can progress through a sequence of advertisements or messages rather than repeating the same advertisements/messages or displaying a random assortment of repeating or non-repeating messages. System 200 may be programmed for the advertisements/messages to be specifically sequenced to hold the interest of drivers and passengers in the following vehicle(s) over a period of time, and to present a purposeful sequence of advertisements/messages rather than random advertisements. Should system 200 determine that the scene behind vehicle 100 changes, or system 200 determines that a new vehicle is now directly behind vehicle 100, system 200 may change the sequence of advertisements/messages for this new scenario of drivers/passengers surrounding vehicle 100. Should the original vehicle that was following vehicle 100 previously return to the position immediately behind vehicle 100, system 200 may recognize the original vehicle and continue the progression of advertisements/messages curated for that specific vehicle.

In an aspect of the present disclosure, system 200 can more effectively deliver location-based advertising than currently-available advertising systems. For example, and not by way of limitation, system 200 may determine that vehicle 100, and a vehicle behind vehicle 100, have taken a freeway exit where Restaurant ABC is located. System 200 may display, on display 104, an advertisement for Restaurant ABC, to the vehicle immediately behind vehicle 100, and may then display a progressive sequence of location-based advertising to the following vehicle which can present all of the attractive elements of Restaurant ABC. Instead of having one chance to convince the driver of the following vehicle to visit Restaurant ABC, system 200 of the present disclosure provides multiple advertising opportunities because of the proximity of the vehicle behind vehicle 100 and the intelligence of system 200.

System 200 may also display internet addresses, also known as Uniform Resource Locators (URLs), or Quick Response (QR) codes which may be used by the surrounding drivers to access discounts and/or special rewards. For example, and not by way of limitation, display 104 of system 200 may display the message "FREE LUNCH," along with an internet URL (e.g.,—www.RestaurantABC.com/lunch) that the drivers/passengers must access in order to obtain more information about the free lunch. By using the inputs from vehicle 100/system 200 to associate the offer with those that accept the offer, advertisers may provide enhanced, restricted or otherwise customized discounts, merchandise, etc. that is being offered and receive fairly quick feedback on the effectiveness of such advertising campaigns. In an aspect of the present disclosure, internet URL addresses and/or QR codes may only be displayed when the vehicle 100 and/or other vehicles around vehicle 100 are stopped.

In another aspect of the present disclosure, where passengers interact with a QR code or URL link displayed on system 200, the passengers of the vehicle behind vehicle 100 might be allowed to exert control over what advertising or messaging they are viewing. For example, and not by way of limitation, after scanning the QR code, surrounding vehicle(s) might be able to choose what types of restaurant discounts they are offered by system 200 e.g., fast food or upscale dining, etc. Further, the passengers of a following vehicle might be encouraged by a message, code, or URL on display 104 of system 200 to reference various forms of social media, message the driver of vehicle 100, or other interactive messaging such as obtaining real and/or virtual rewards. In such an aspect, special "Bonus Items" might be advertised on the system 200, which offer the opportunity for both the driver of vehicle 100 and occupants of the following vehicle to mutually benefit from a purchase. For example, an advertisement for a hamburger available at an upcoming exit might offer bonus compensation to the drivers of both vehicles if both drivers stop at the restaurant.

In addition to various forms of advertising, system 200 may be used to display messaging as well, which can be initiated by either the driver of vehicle 100, the supplier of system 200, the supplier's affiliated entities, and/or other parties. These messages might be simple communications such as "Hello!" or "Smile!" or social or political statements such as "Don't Pollute!" or "Vote Lincoln!", jokes or riddles, or practical commands (for drivers who know one another) such as: "Need Gas!" Such access to system 200 may be limited to certain times or a certain number of times during a given time period.

System 200 may also be used to record various scenarios that may be important for the driver of vehicle 100 above and beyond the functions of a backup camera. Camera 308, for example, may record the scene behind vehicle 100 during vehicle 100 motion, and should a traffic accident occur, e.g., when another vehicle rear-ends vehicle 100, system 200 may provide the driver of vehicle 100 with evidence of the event.

System Connection to Vehicle

Figure 4:
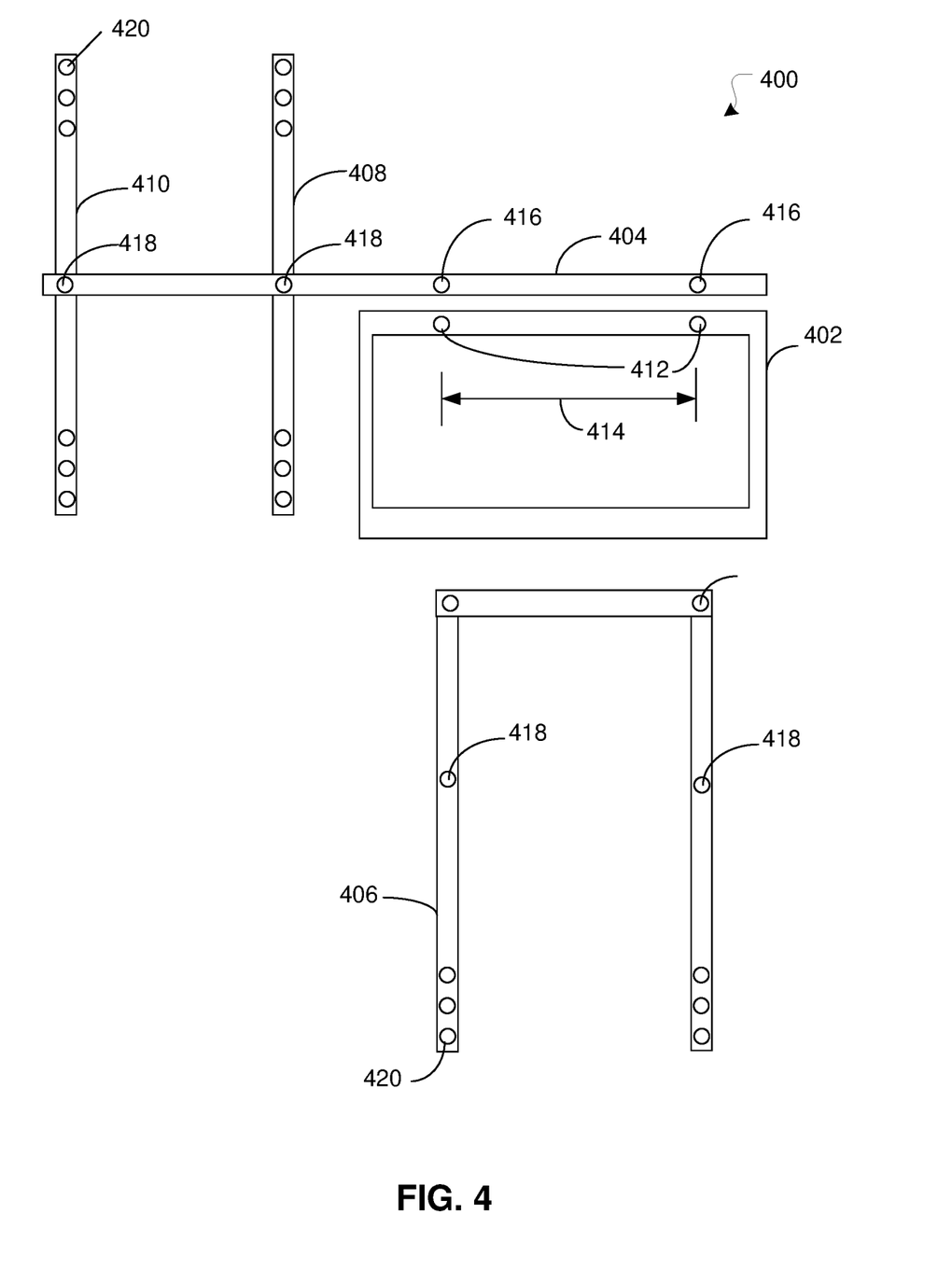
FIG. 4 illustrates a mounting device in accordance with an aspect of the present disclosure.

FIG. 4 illustrates a mounting device in accordance with an aspect of the present disclosure.

Mounting device 400 may comprise a frame 402, horizontal member 404, vertical member 406, and display members 408 and 410. Frame 402 has mounting holes 412 spaced at a distance 414. Distance 414 may be a standard distance for license plates 102 that are attached to vehicles 100.

Frame 402 may be a part of mounting device 400, or may be a separate frame 402 that is provided by the owner/driver of vehicle 100. Frame 402 may be a "personalized" frame, in that frame 402 may be a frame that states "alumni" or a personal message related to the owner and/or vehicle 100.

Horizontal member 404 has mounting holes 416 that allow horizontal member 404 to attach to frame 402 via mounting holes 412. Although shown pointing left, horizontal member 404 may face to the right if desired. Horizontal member 404 also has mounting holes 418 that allow horizontal member 404 to mount to display members 408 and 410.

Vertical member 406 has mounting holes 416 similar to those of horizontal member 404, which holes 416 allow vertical member 406 to attach to frame 402 via mounting holes 412. Although shown pointing down, vertical member 406 may face or point up if desired. Vertical member 406 also has mounting holes 418 that allow vertical member 406 to mount to display members 408 and 410.

Display members 408 and 410 have mounting holes 420 that allow for display members 408 and 410 to couple to display 104.

Display 104 may vary in size, and may require a number of mounting holes 420. For example, and not by way of limitation, display 104 may be a 14 inch diagonal screen, or a long narrow "banner" type screen e.g., 8" high by 48" long. Different display 104 sizes are possible within the scope of the present disclosure.

Mounting device 400 may be of a "quick release" nature, allowing display 104 to be coupled and/or uncoupled with relative ease. For example, and not by way of limitation, the mounting hardware for use in mounting holes 420 may be of a snap-lock type, while the remainder of the mounting hardware may be screws, rivets, etc. Further, mounting device 400 may include a locking mechanism to deter unauthorized removal of display 104. Additional protections against unauthorized removal may also be included, e.g., a GPS tracker in display 104, etc.

Mounting device 400 may also include other supporting mounts to stabilize display 104 and/or reduce incidental movement of display 104 when vehicle is in motion. Further, other types of mounting devices 400, e.g., suction cups, magnets, tie-downs, or other means may also be used, in conjunction with and/or instead of mounting device 400, without departing from the scope of the present disclosure. Alternative or additional mounting devices 400 may also mount to other portions of vehicle 100, e.g., mounting to a trailer hitch, hanging from a trunk or other part of vehicle 100 with straps, hooks, suction cups, rigid or semi rigid brackets or extensions, and/or other means.

System Usage Tracking and Compensation

In an aspect of the present disclosure, system 200, which may include software and/or use of applications on a cellular telephone or other device, may track the advertisements, etc., and associated times of display of the advertisements, that are displayed on display 104. The times, advertisements, types of advertisements, time stopped, time moving, etc., may then be used to determine a compensation for the driver of vehicle 100.

As an example, and not by way of limitation, an application can record the GPS data from the driver's mobile device (and/or the GPS data of vehicle 100 and/or the GPS data of device 202) to track the routes traveled by vehicle 100. The application can also record the number of times and duration of times that a static or dynamic advertisement or message is displayed on display 104, and can record the scenes surrounding vehicle 100 during travel times. These and other data points can be used to construct a payment algorithm that determines the compensation paid to the driver/operator of vehicle 100. The payment can be displayed on the application such that the driver/operator of vehicle 100 can be informed regarding the compensation due.

System 200 can also supply such information, e.g., camera 308 information, vehicle 100 geolocation, etc., to advertisers such that the times, locations, etc. of a particular advertisement are known and the effectiveness of such advertisements can be better determined. For example, an advertiser can be given data on: (1) the exact length of time that a particular vehicle was exposed to an advertisement; (2) whether the advertisement was displayed in daytime or nighttime; (3) whether there were passengers in the vehicle to which the ad was displayed; (4) how long it took an individual to respond to an ad; and/or myriad other data, allowing advertising strategies to be developed and fine-tuned.

Depending on the types of advertisement that are displayed by a given system 200, different amounts of compensation may be paid. For example, if only short, "static" advertisements are displayed, a first tier of compensation may be paid; however, if longer, more detailed advertisements, or sequence of advertisements are displayed (e.g., when vehicle 100 is in heavy traffic and a captive audience may be available), a different tier of payment may be awarded to the driver of vehicle 100. Many different algorithms and determinations of compensation may be employed without departing from the scope of the present disclosure.

Further, system 200 may allow for user generated advertising to be shown on display 104. Because a driver of vehicle 100 knows ahead of time that he/she will be driving to work, and he/she knows the route to be traveled, that user may create a unique advertising sequence during their drive time, as such a driver would know what shops are on their chosen route. As such, drivers can create their own advertising scheme if they think it is likely to generate more interest. For example, a truck driver who frequents a diner that caters to truck drivers might suggest an ad offering "Free Coffee for Truck Drivers." The driver may then have an option to submit photo(s) and/or video(s) which would be incorporated into the ad.

Figure 5:
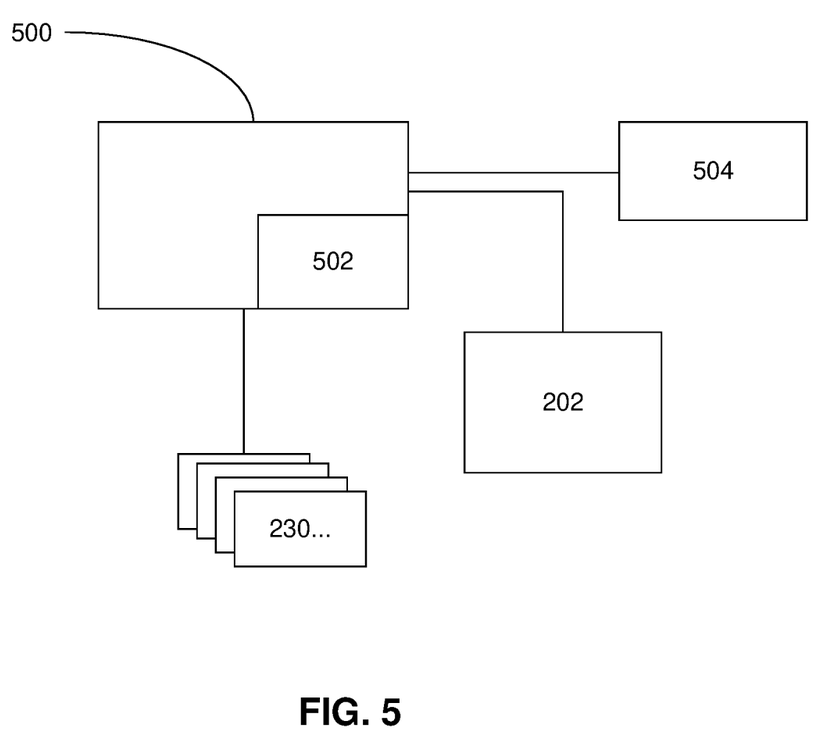
FIG. 5 illustrates a controller in accordance with an aspect of the present disclosure.

FIG. 5 illustrates a controller in accordance with an aspect of the present disclosure.

System 200 can include a controller or other processing unit, such as a microcontroller 500, shown schematically in FIG. 5. The microcontroller 500 may include an internal memory 502 and/or external memory 504 and can serve many different functions. For example, in one embodiment, the microcontroller 500 may serve to regulate the power provided to system 200 102, control system 200 through readings from sensor(s) 230 and/or other sensors within system 100, accept input from device 202, or other controlling and/or monitoring functions. Many different functions are possible without departing from the scope of the present disclosure.

The memory, which may be internal memory 502 or external memory 504 to microcontroller 500, may be implemented in firmware and/or software implementation. The firmware and/or software implementation methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit (e.g., microcontroller 500). Memory may be implemented within the processor unit or external to the processor unit. As used herein, the term "memory" refers to types of long term, short term, volatile, nonvolatile, and/or other non-transitory memory and is not to be limited to a particular type of memory or number of memories, or type of media upon which memory is stored.

If implemented in firmware and/or software, and/or as part of microcontroller 500 and/or memory 502/504, the functions described herein may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer (e.g., microcontroller 500); disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors (e.g., microcontroller 500) to implement the functions outlined in the claims.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store specified program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The present disclosure is described herein with reference to certain embodiments, but it is understood that the disclosure can be embodied in many different forms and should not be construed as limited to the embodiments set forth herein. In particular, the present disclosure is described below in regards to certain modules having features in different configurations, but it is understood that the present disclosure can be used for many other modules and/or configurations. The modules and systems can also have many different shapes beyond those described below.

All physical dimensions, weights, temperatures, etc. in the description and attached drawings are exemplary in nature. It is understood that embodiments of the present disclosure can have various dimensions/weights/temperatures/etc. varying from those shown in the attached drawings.

Although the present disclosure and its advantages have been described in detail, it should be understood that various changes, substitutions and alterations can be made herein without departing from the technology of the disclosure as defined by the appended claims. It should also be understood that when a feature or element may be referred to as being "on" another element, it can be directly on the other element or intervening elements may also be present unless specifically stated otherwise. Furthermore, relative terms such as "inner", "outer", "upper", "above", "lower", "beneath", and "below", and similar terms, may be used herein to describe a relationship of one element or attribute to another. With regard to the figures, it is to be understood that these terms are intended to encompass different orientations of the device in addition to the orientation depicted.

Moreover, the scope of the present application is not intended to be limited to the particular configurations of the process, machine, manufacture, composition of matter, means, methods, and/or steps described in the specification. As one of ordinary skill in the art will readily appreciate from the disclosure, processes, machines, manufacture, compositions of matter, means, methods, and/or steps, presently existing or later to be developed, that perform substantially the same function or achieve substantially the same result as the corresponding configurations described herein may be utilized according to the present disclosure. Accordingly, the appended claims are intended to include within their scope such processes, machines, manufacture, compositions of matter, means, methods, and/or steps.

Although the terms first, second, etc. may be used herein to describe various elements, components, regions, and/or sections, these elements, components, regions, and/or sections should not be limited by these terms. These terms are only used to distinguish one element, component, region, or section from another element, component, region, or section. Thus, a first module, element, component, region, or section discussed below could be termed a second module, element, component, region, or section without departing from the teachings of the present disclosure.

The description of the disclosure is provided to enable any person reasonably skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed:

1. A method for delivering mobile advertising comprising:
providing one or more electronic devices in communication with a sensor and operable to capture a scene via a camera input obtained by a camera;
analyzing the camera input received by an electronic device of the one or more electronic devices to identify one or more of a physical characteristic of a detected vehicle in the captured scene, a behavior of the detected vehicle, and a number of occupants in the detected vehicle,
selecting a media for delivery based on an analysis of one or more of the physical characteristic of the detected vehicle, the behavior of the detected vehicle, a determination of whether the detected vehicle was previously captured by the one or more electronic device, the number of occupants and the one or more characteristics of the occupants in the detected vehicle, a geolocation of the electronic device, and a detected motion of the user device selected from motion and no motion,
delivering the media from one of the one or more electronic devices to a display,
receiving the media by the display,
detecting a motion of one of the one or more electronic devices via a motion sensor;
displaying the media on the display wherein display of the received media is initiated when the detected motion by the motion sensor is no motion,
wherein the media is displayed for a duration of time that the detected vehicle is facing the display, repeats a sequence when a new vehicle is detected, are selected and shown in response to the detected vehicle, or resumes the sequence when the previously detected vehicle is identified,
further wherein the media progresses through a specific sequence of selected advertisements or messages before repeating, rather than repeating the same advertisement or messages, or displaying a random assortment of repeating or non-repeating messages.

2. The method for delivering mobile advertising of claim 1, wherein the media is a video segment or an image.

3. The method for delivering mobile advertising of claim 2, wherein a length of the video segment is based at least in part on a change in the scene.

4. The method for delivering mobile advertising of claim 2 wherein one or more of videos and images are preprogrammed onto the device.

5. The method for delivering mobile advertising of claim 1, wherein the camera operable to capture the scene and the sensor and the display face a rear of the automobile, such that a vehicle behind the automobile can view the image shown on the display device.

6. The method for delivering mobile advertising of claim 1, wherein the at least one sensor is an accelerometer.

7. The method for delivering mobile advertising of claim 1, further comprising calculating a duration of a display time for each image in the at least one image shown on the display device in the direction based on information collected from the at least one sensor.

8. The method for delivering mobile advertising of claim 1, wherein the user device sends at least one image to the display device further based at least in part on a time of day.

9. The method for delivering mobile advertising of claim 1, wherein the at least one image comprises a quick response (QR) code.

10. The method for delivering mobile advertising of claim 1, wherein the at least one image comprises a uniform resource locator (URL).

11. The method for delivering mobile advertising of claim 1, wherein the at least one image comprises a discount code.

12. The method for delivering mobile advertising of claim 1, wherein a remuneration is associated with each image of the at least one image.

13. The method for delivering mobile advertising of claim 1, wherein a list of images is pre-programmed into the device to be shown on the display device.

14. The method for delivering mobile advertising of claim 1, further comprising the step of indicating that a vehicle is about to stop.

15. The method for delivering mobile advertising of claim 1, further comprising displaying a progressive sequence of location-based advertising.

16. The method for delivering mobile advertising of claim 1, wherein the media received is based on at least one of the geolocation of the electronic device, a brand of a detected vehicle, a make of the detected vehicle, a model of the detected vehicle, a presence of a passenger in the detected vehicle, a number of passengers in the detected vehicle, a license plate of the detected vehicle, and one or more businesses proximate to the geolocation of the electronic device.

17. The method for delivering mobile advertising of claim 1, further comprising displaying a media sequence for a period of time when the sensor indicates the detected vehicle is facing the screen.

18. The method for delivering mobile advertising of claim 1, further comprising changing the media displayed when the sensor indicates a new vehicle is facing the screen.

19. The method for delivering mobile advertising of claim 1, further comprising determining whether the detected vehicle has been previously sensed and displays a new media not previously displayed for the detected vehicle.

20. The method for delivering mobile advertising of claim 1 further comprising projecting an image via a projection system.

21. The method for delivering mobile advertising of claim 20 further comprising projecting a holographic image.

22. The method for delivering mobile advertising of claim 1 further comprising generating a report including two or more of duration, time of day, type of media presented, type of vehicle receiving the media presented, and response to the media.

23. The method for delivering mobile advertising of claim 1 further comprising receiving an input message from the electronic device for display.

* * * * *